United States Patent
Sakai et al.

(10) Patent No.: US 7,203,015 B2
(45) Date of Patent: Apr. 10, 2007

(54) METHOD AND APPARATUS FOR DECODING SYNC MARKS IN A DISK

(75) Inventors: Yuji Sakai, Ome (JP); Kazuhito Shimomura, Fussa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 301 days.

(21) Appl. No.: 10/901,295

(22) Filed: Jul. 29, 2004

(65) Prior Publication Data
US 2005/0024759 A1 Feb. 3, 2005

(30) Foreign Application Priority Data
Jul. 31, 2003 (JP) ............... 2003-204387

(51) Int. Cl.
*G11B 5/09* (2006.01)
(52) U.S. Cl. .......................... 360/48; 360/51
(58) Field of Classification Search ............... None
See application file for complete search history.

(56) References Cited

U.S. PATENT DOCUMENTS

| | | | |
|---|---|---|---|
| 5,844,920 A | 12/1998 | Zook et al. | |
| 5,847,890 A | 12/1998 | Hattori | |
| 5,852,524 A | 12/1998 | Glover et al. | |
| 6,009,549 A * | 12/1999 | Bliss et al. | 714/769 |
| 6,603,622 B1 * | 8/2003 | Christiansen et al. | 360/66 |

FOREIGN PATENT DOCUMENTS

| JP | 10-49806 | 2/1998 |
|---|---|---|
| JP | 2001-143406 | 5/2001 |

OTHER PUBLICATIONS

Austrian Search Report dated May 25, 2005 for Singapore Patent Appl. No. 200404386-5.

* cited by examiner

*Primary Examiner*—Andrea Wellington
*Assistant Examiner*—Varsha A. Kapadia
(74) *Attorney, Agent, or Firm*—Pillsbury Winthrop Shaw Pittman, LLP

(57) ABSTRACT

In a disk drive that performs perpendicular magnetic recording, the read/write channel has a sync mark generator. The sync mark generator generates a second sync mark before the read/write channel operates to write data on a disk. The second sync mark has a bit pattern including a series of bits representing positive polarity and a series of bits representing negative polarity. The series of bits, which is longer than the other, has a bit length that is at least 50% but less than 85% of the total bit length of the second sync mark.

17 Claims, 6 Drawing Sheets

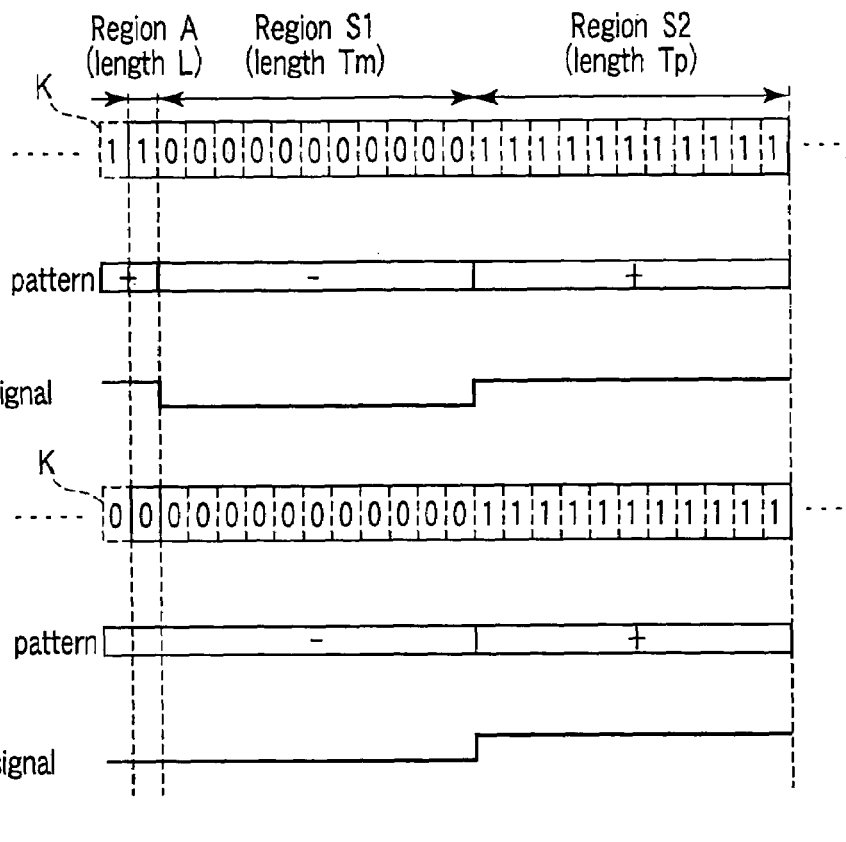
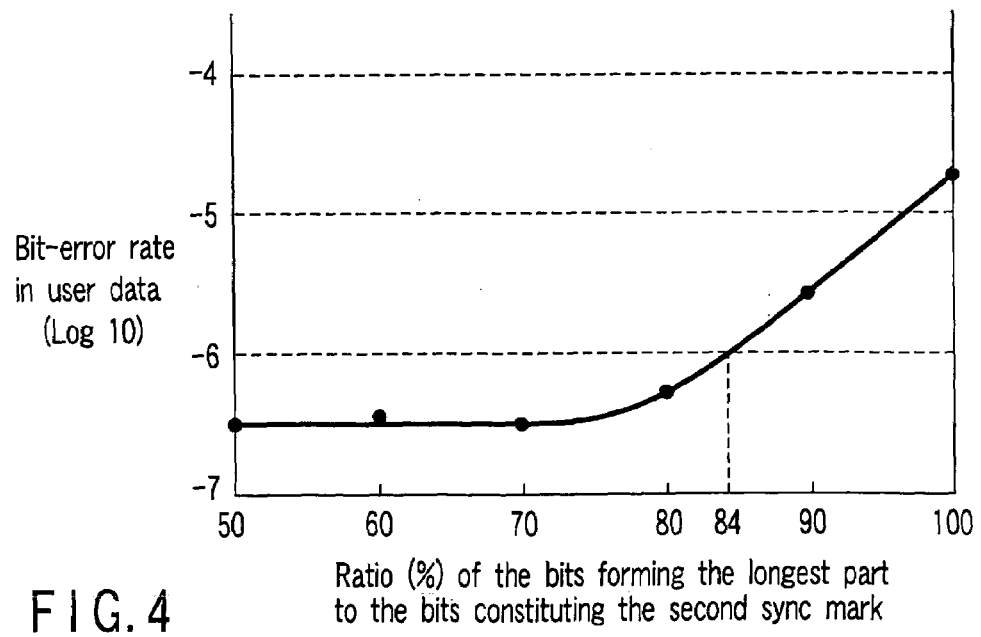

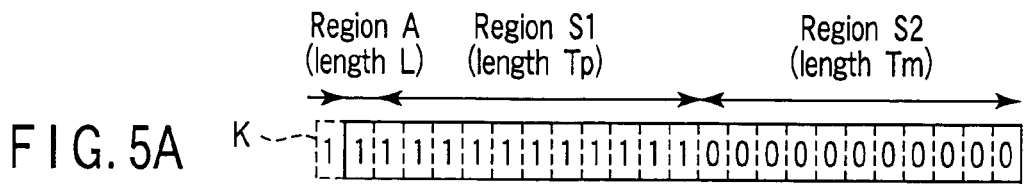
FIG. 5A
FIG. 5B
FIG. 6A
FIG. 6B
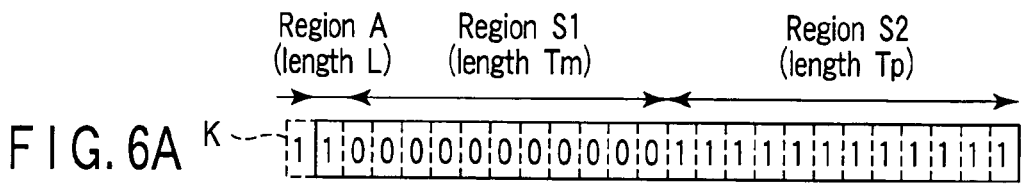
FIG. 7A
FIG. 7B
FIG. 9A
FIG. 9B
Bits output from the post-coder
FIG. 9C

METHOD AND APPARATUS FOR DECODING SYNC MARKS IN A DISK

CROSS-REFERENCE TO RELATED APPLICATIONS

This application is based upon and claims the benefit of priority from prior Japanese Patent Application No. 2003-204387, filed Jul. 31, 2003, the entire contents of which are incorporated herein by reference.

BACKGROUND OF THE INVENTION

1. Field of the Invention

The present invention relates to a disk drive that performs perpendicular magnetic recording. More particularly, the invention relates a technique of writing sync marks in the data sectors of a disk.

2. Description of the Related Art

In most disk drives, a representative example of which is a hard disk drive, user data supplied from a host system (e.g., a personal computer) are divided into 4096-bit (512-byte) data blocks. The data blocks iare recorded in the recording region of a disk-shaped recording medium (hereinafter called "disk"). The recording region of the disk is managed in units of so-called data sectors. Each data block (i.e., part of the user data) is recorded in one data sector, together with other data.

Each data block is stored in one data sector, in a specific format. That is, the data block consists of a preamble, a sync mark, user data, and ECC (error correction code) data. The preamble is a signal of a prescribed frequency. The preamble is used to achieve AGC (auto gain control) for adjusting the amplitude of a signal reproduced from the data sector by the magnetic head (hereinafter referred to as "head") or to accomplish clock synchronization for decoding data. The sync mark is a bit pattern that is used to detect the header of the user data.

The recent trend in the art is to divide the sync mark into two sync marks. Thus, the user data is divided into two user-data items. The first user-data item (bit length: X bits) is recorded between the first and second sync marks, and the second user-data item (bit length: 4096-X bits) is recorded, following the second sync mark. (See, for example, U.S. Pat. No. 5,844,920, 1996, and Jpn. Pat. Appln. KOKAI Publication 2001-143406.)

The first sync mark is used to detect the header of the first user-data item that follows it. It is, for example, a random pattern having a bit length of, for example, about 10 to 50 bits. In the disk drive, a decoder decodes the reproduced signal, generating a series of bits. The series of bits is compared with a reference bit pattern for the first sync mark. Namely, pattern matching is performed, thereby to detect the first sync mark.

More precisely, the first sync mark is detected when its bit pattern is found identical to the reference bit pattern. Once the first sync mark is detected, the bit that follows the last bit of the first sync mark is recognized as the first bit of the user-data item that follows the first sync mark. The decoding of the user-data item is then started. In practice, the first sync mark is considered to have been detected, even if its all bits, but two, are identical to the bits of the reference bit pattern.

The first sync mark may not be detected due to the thermal asperity (TA) that has resulted mainly from the characteristics of the GMR element that is used as the head. (For details of TA, see Jpn. Pat. Appln. KOKAI Publication 10-49806.) If the first sync mark is not detected, an attempt will be made to detect the second sync mark.

If the first sync mark is not found and the second sync mark is detected, the first data-user item (bit length: X bits) is considered erroneous data or deleted data. The first data-user item is correctly decoded, whenever necessary, through correction process that uses the ECC data.

As pointed out above, the second sync mark is used when the first sync mark cannot be detected, mainly because of thermal asperity (TA). In view of this, the second sync mark should have such a bit pattern that it may be detected at high probability in spite of the thermal asperity.

The second sync mark used in the conventional disk drive that performs longitudinal magnetic recording usually has a bit pattern that is a series of "0s" and "1s" arranged in accordance with the NRZ (non-return to zero) rule. In the longitudinal magnetic recording, any signal to be reproduced, which corresponds to such a bit pattern, has constant amplitude and can hardly be "DC-erased."

When thermal asperity (TA) develops, the base line for signals reproduced shifts, as is confirmed in the art. As a result, any signal reproduced changes in amplitude, very likely to cause an error in the detection of data. The second sync mark is more liable to detection error than the first-sync mark, due to the shifting of the base line.

Any signal reproduced by the disk drive that performs perpendicular magnetic recording has a low-frequency component that contains a DC component. Thus, any signal reproduced undergoes a base-line shift that is called "low-band cutoff strain" when the read channel has such a transfer characteristic that it cuts off low-frequency components.

To the read channel having low-band cutoff characteristic, the second sync mark is problematical, because its bit pattern is a series of "0s" and "1s" that are in accordance with the NRZ (non-return to zero) rule. The base-line offset, which the read channel exhibits for the second sync mark that has fixed amplitude, is almost maximal at the end part of the second sync mark. Inevitably, the base-line offset persists for some time in the user data, which follows the second sync mark and which is a random bit pattern.

In short, the base-line offset caused by the second sync mark persists for some time in any disk drive that performs perpendicular magnetic recording. Consequently, the disk drive may fail to detect the first several bits of the user data, which immediately follow the second sync mark.

BRIEF SUMMARY OF THE INVENTION

In accordance with an embodiment of the present invention, there is provided a disk drive that includes means for recording sync marks that can be detected at high probability and does not increase the error rate in reproducing the user data that follows the sync marks.

The disk drive comprises: a disk-shaped recording medium having data sectors each having a first sync-mark region, a second sync-mark region and a data region; a magnetic head which writes data in each data sector of the disk-shaped recording medium; sync-mark generating means for generating a bit pattern of a first sync mark for detecting a head of each data sector and a bit pattern of a second sync mark, which is different from the bit pattern of the first sync mark, the second sync mark having a bit pattern including a series of bits representing positive polarity and a series of bits representing negative polarity, the series of bits, which is longer than the other, having a bit length that is at least 50% of the total bit length of the second sync mark, not exceeding an upper limit set in accordance with a tolerant rate of error in reproducing data from the data region; and writing means for supplying a data signal to the magnetic head, the data signal including the first sync mark and second sync mark which have been generated by the sync-mark generating means.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3A to 3F are a diagram representing the bit pattern of the second sync mark that is used in the first embodiment;

FIG. 4 is a graph explaining a bit pattern desirable for the second sync mark that is used in the first embodiment;

FIGS. 5A and 5B are a diagram depicting a first modification of the bit pattern for the second sync mark;

FIGS. 6A and 6B are a diagram showing a second modification of the bit pattern for the second sync mark;

FIGS. 7A and 7B are a diagram depicting a third modification of the bit pattern for the second sync mark;

FIG. 9A to 9C are diagrams representing the bit patterns for the second sync mark that is used in the other embodiment;

DETAILED DESCRIPTION OF THE INVENTION

Embodiments of this invention will be described, with reference to the accompanying drawings.

Figure 1:
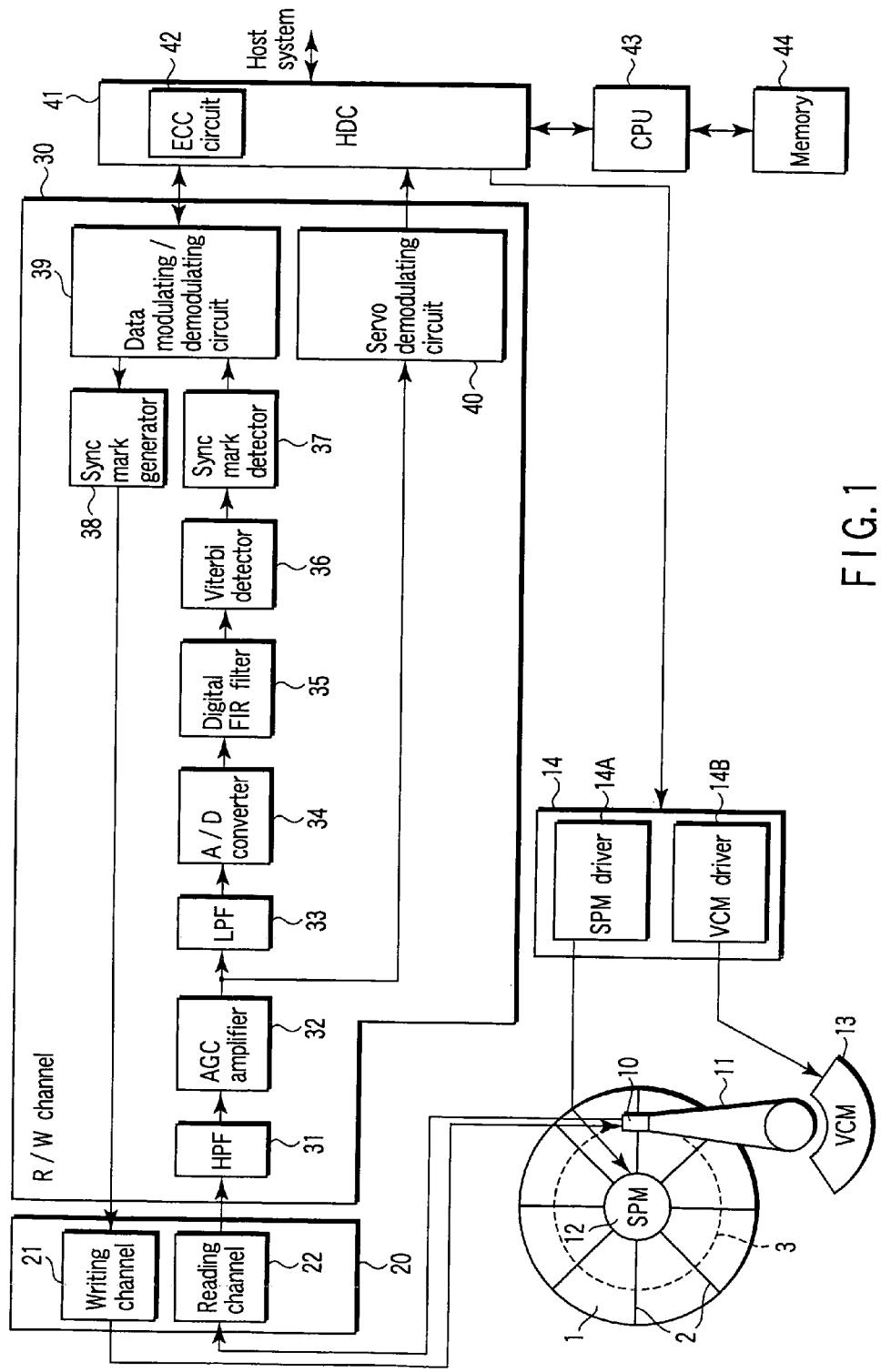
FIG. 1 is a block diagram showing the major components of a disk drive according to a first embodiment of this invention.

FIG. 1 is a block diagram showing the major components of a disk drive according to a first embodiment of the invention.

(Configuration of the Disk Drive)

The disk drive according to the embodiment is a perpendicular magnetic recording device. As FIG. 1 shows, it comprises a disk 1, a spindle motor (SPM) 12, a head 10, a drive mechanism, and a control/signal-processing circuit system. The disk 1 exhibits magnetic anisotropy perpendicular to its surfaces. The SPM 12 rotates the disk 1. The head 10 includes a write head and a read head. The write head can perform perpendicular magnetic recording. The read head comprises a giant magnetoresistive (GMR) element. The actuator holds the head 10 and moves the head 10 over the disk 1 in a radial direction thereof.

The actuator comprises an arm 11 and a voice coil motor (VCM) 13. The arm 11 holds the head 10 and includes a suspension. The VCM 13 generates a drive force. The actuator moves the head 10 to a target position over the disk 1 (that is, to a target track on the disk 1), as it is servo-controlled by a microprocessor (CPU) 43.

The control/signal-processing circuit system has a head amplifier circuit 20, a read/write (R/W) channel 30, a hard-disk controller (HDC) 41, the CPU 43, a memory 44, and a motor driver 14. The motor driver 14 supplies a drive current to the VCM 13 and the SPM 12.

The HDC 41 serves as interface between the disk drive and a host system (e.g., a personal computer or a digital apparatus). It can transfer the data read from the disk 1 (hereinafter referred to as "read data") and the data to be written in the disk 1 (hereinafter referred to as "write data"). The HDC 41 incorporates an error-correcting circuit (ECC) 42 and can therefore determine whether the read data supplied from the read/write channel 30 has errors or not. If the read data has errors, the HDC 41 corrects the read data.

The CPU 43 is the main control component of the disk drive. In other words, the main element of the servo system servo-controls the actuator, ultimately moving the head 10 to a target track. The CPU 43 controls the seek operation and tracking of the head 10 in accordance with the servo data generated by the servo demodulating circuit 40 that is provided in the read/write channel 30. More specifically, the CPU 43 controls the control voltage applied to the VCM driver 14B that is incorporated in the motor driver 14. Having its input voltage so controlled, the VCM driver 14A drives and controls the VCM 13 of the actuator.

The memory 44 includes a RAM, a ROM and a flash EEPROM. It stores programs for controlling the CPU 43 and various control data items. The motor driver 14 has an SPM driver 14A, in addition to the VCM driver 14B. The SPM driver 14A drives the SPM 12.

The head amplifier circuit 20 has a write amplifier 21 and a read amplifier 22. The write amplifier 21 converts write data into a recording current, which is supplied to the write head. The read amplifier 22 amplifies any signal that the read head has read from the disk 1. The signal thus amplified is supplied to the read/write channel 30. The signal the read head has read corresponds to the data (i.e., sync marks and user data) recorded in the disk 1 by the write head that performs perpendicular magnetic recording.

The read/write channel 30 has two sub-channels, i.e., read channel and write channel. The write channel has a sync mark generator 38 and a data modulator. The data modulator constitutes a data-modulating/demodulating circuit 39, jointly with a data demodulator (later described). The data-modulating/demodulating circuit 39 carries out a run-length limited (RLL) encoding/decoding process at a predetermined coding ratio M/N. (That is, the circuit 39 encodes M-bit user data into N-bit data that is to be recorded.)

As will be described later, the sync mark generator 38 generates two bit patterns (columns of bits) that accords with the data format of every sector provided on the disk 1. The bit patterns correspond to a first sync mark and a second sync mark. These bit patterns will be added to the user data that is to be written after modulated by the data-modulating/demodulating circuit 39 (see FIG. 2).

The read channel includes a high-pass filter (HPF) 31, an auto gain-control (AGC) amplifier 32, a low-pass filter (LPF) 33, an analog-to-digital (A/D) converter 34, a digital finite impulse-response (FIR) filter 35, a viterbi detector 36, a sync mark detector 37, and the servo demodulating circuit 40.

The HPF 31 shields the AGC amplifier 32 and the read amplifier 22 (provided in the head amplifier circuit 20) from a DC bias, thus achieving AC coupling. The AGC amplifier 32 is an amplifier that controls itself to amplify any signal reproduced from the disk 1 to a desired constant amplitude. The LPF 33 is a filter that removes noise of any frequency higher than those within a prescribed band.

The A/D converter 34 converts an analog signal reproduced from the disk 1, to a digital signal. The digital FIR filter 35 performs equalization on the digital signal, imparting to this signal a waveform of perpartial response (PR) type, so that the signal may become fit for perpendicular magnetic recording of, for example, PR3 scheme.

The viterbi detector 36 detects the recorded bits, using a viterbi algorithm that is so described to decode the digital signal having the desired PR waveform into a signal that has a maximum likelihood.

The sync mark detector 37 performs bit-pattern matching, thereby detecting the first sync mark from the bits detected by the viterbi detector 36. The sync mark detector 37 may not detect the first sync mark within a preset time that is longer than the time in which first sync mark should be detected and shorter than the time in which the second sync mark should be detected. In this case, the sync mark detector 37 detects the second sync mark by performing the bit matching.

The servo demodulating circuit 40 demodulates the signal reproduced from the servo-sector region 2 of the disk 1, thus generating a servo signal. The servo signal is servo data has been recorded in the servo-sector region 2. (The servo data comprises a cylinder code and a servo-burst signal.)

(Data Format)

Figure 2A:
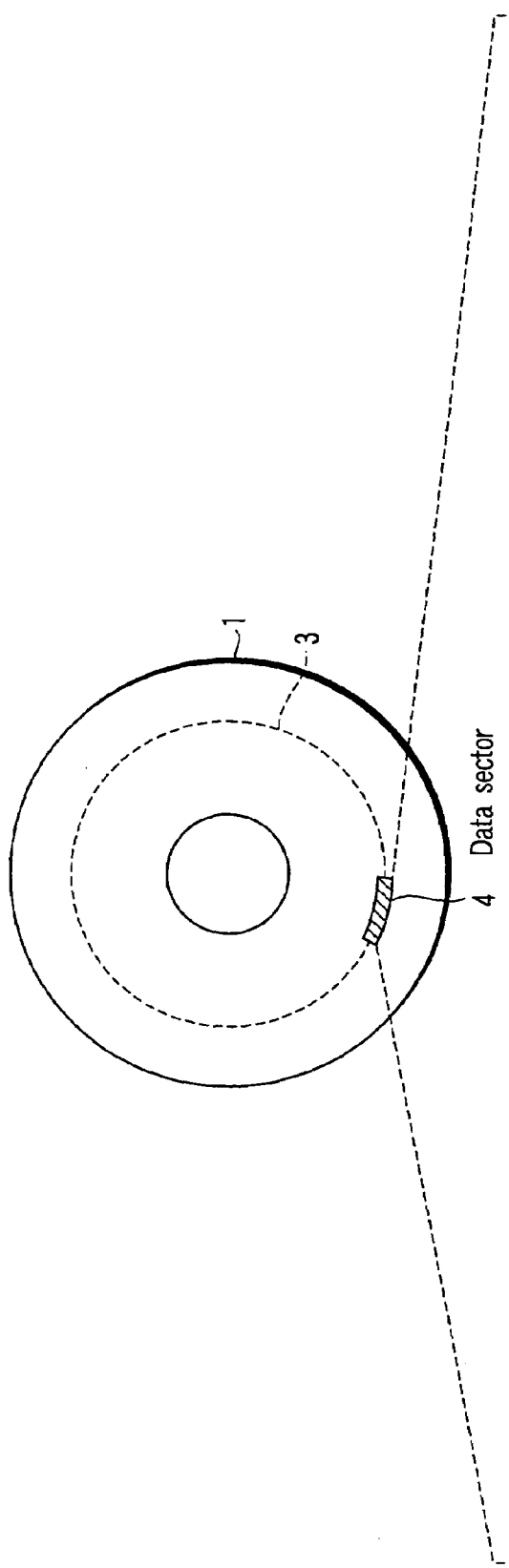
FIGS. 2A and 2B are a diagram illustrating the data format for the data sectors employed in the first embodiment.

As FIG. 2A shows, the disk 1 has a number of data tracks 3 on either surface. The data tracks 3 are concentric to one another. As seen from 2A, each data track 3 consists of a plurality of data sectors 4. In the disk drive, the data transferred from the host system is divided into data blocks, which are recorded in the data sectors 4 of the disk 1.

Figure 2B:
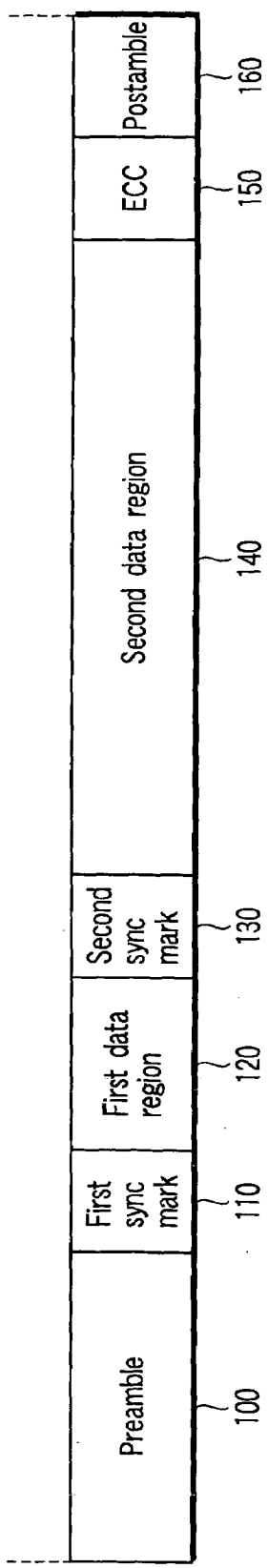

The data-modulating/demodulating circuit 39 modulates the user data at a predetermined coding ratio M/N, generating Y-bit data. The Y-bit data is recorded in a data sector 3. As FIG. 2B depicts, the Y-bit data consists of a preamble 100, a first sync mark 110, a first user data item 120, a second sync mark 130, a second user data item 140, ECC data 150, and a postamble 160, which are mentioned in the order they are reproduced. The first user data item 120 is modulated data that consists of X bits. The second user data item 140 modulates data, too, which consists of (X−Y) bits. The ECC data is modulated, too.

The preamble 100 is ACT that adjusts the amplitude of any signal that the head 10 reads from the data sector, to a predetermine value, or is a signal of a predetermined frequency, which is used to achieve clock synchronization in the process of decoding data. The first user data item 120 is modulated data having a bit length X, which is N times as great as the bit length N of coded words.

(Detection of Sync Mark and Data Writing)

How sync marks are written in the present embodiment will be explained, with reference to FIG. 3A to 3F and FIG. 4, as well as FIG. 1 and FIGS. 2A and 2B. It will first be described how sync marks are detected.

In the disk drive, the CPU 43 performs a servo control (i.e., the positioning of the head), moving the head 10 to the data track 3 that is the target track of the disk 1. The head 10 reads or writes data in or from the data sector 4 included in the data track 3. The data read from the data sector 4 or the data to be written in the data sector 4 contains the first sync mark 110 and the second sync mark 130, as well as the user data items 120 and 140.

In the data-reading operation, the data-modulating/demodulating circuit 39 demodulates (or decodes) the first user data item 120 when the sync mark detector 37 detects the first sync mark 110. When the detector 37 detects the second sync mark 130, the data-modulating/demodulating circuit 39 demodulates (or decodes) the second user data item 140. The sync mark detector 37 then carries out pattern matching on the series of bits output from the viterbi detector 36, which has decoded the digital reproduced signal, and a reference bit pattern of a sync mark. When the series of bits is found to be identical to the reference bit pattern, the sync mark detector 37 outputs the data showing the result of the pattern matching, to the data-modulating/demodulating circuit 39.

From the result of the pattern matching, the data-modulating/demodulating circuit 39 determines that the bits that follow the last bit of the sync mark constitute the user data that has been modulated. Then, the circuit 39 performs demodulates the modulated N-bit reproduced data into M-bit user data, i.e., the original data.

The sync mark detector 37 determines that the sync mark has been detected, even if all bits of the S-bit sync mark form a pattern that is not identical to the reference bit pattern. For instance, when (S-1) bits or (S-2) bits of the S-bit sync mark are identical to the corresponding bits of the reference bit pattern, the detector 37 determines that the sync mark has been detected.

The sync mark detector 37 first detects the first sync mark 110. If the first sync mark 100 is successfully detected, bits that are obtained by extracting the bits corresponding to the second sync mark 130, from the series of bits output from the viterbi detector 36. These bits are supplied to the data-modulating/demodulating circuit 39.

If the sync mark detector 37 fails to detect the first sync mark 110, it the second sync mark. The time in which the first sync mark may be detected after the start of reproducing the data from the data sector can be predicted. So can be the time in which the second sync mark may be detected. Hence, it is determined to be impossible to detect the first sync mark 110, if a time longer than the predicted time required to detect the first sync mark and shorter than the predicted time required to detect the second sync mark has passed without detecting the first sync mark 110.

The sync mark detector 37 may fail to detect the first sync mark 110 and may detect the second sync mark 130 in success. If this is the case, the data-modulating/demodulating circuit 39 demodulates the second user data item 140 that follows the second sync mark 130. The resultant demodulated data is user data that has a bit length of (Y−X)'N/M. The data-modulating/demodulating circuit 39 adds a data item having a bit length of, for example, (X×N)/M, all bits being "0," which corresponds to the first user data item (X bits), to the head of the demodulated data. The combination of this data item and the demodulated data is output to the HDC 41.

In the HDC 41, the ECC 42 uses the ECC data 150 contained in the demodulated data 150 output from the data-modulating/demodulating circuit 39. Thus, the ECC 42 performs error correction on the data having bit length (X×N)/M and corresponding to the first user data item, thereby decoding the first user data item (bit length: X).

The ECC data 150 to be added to the user data is, for example, a RS (Reed-Solomon) code. The ECC data 150 may be an RS code consisting of GF (210) bits and containing an ECC redundant data of 40 symbols (400 bits). In this case, at most 20 symbols (200 bits) can be corrected. Hence, the ECC 42 can reliably decode the first user data item 110 even if the data item 110, i.e., demodulated data having a bit length of (X×N)/M, is erroneous in its entirely, provided that (X×N)/M is equal to or less than 400 (X×N)/M≦400).

(Writing of the Second Sync Mark)

As pointed out earlier, the first sync mark 110 may not be detected while the data is being read from the disk 1, due to the base-line offset caused in the reproduced signal by the thermal asperity (TA). Generally, TA takes place when the head 10 contacts the tiny projections (defects) on the disk 1, inevitably making a base-line offset of the reproduced signal.

The base-line offset is a stepwise change of the base line. It gradually decreases, along a curve represented generally by an exponential function, until the base line of the reproduced signal becomes a normal value. As the base line of the signal changes, the amplitude of the signal changes. Inevitably, errors of data detection will likely occur. Data-detection errors would occur, particularly in the read/write channel 30. This is because the first sync mark 110 has a random bit pattern that the user data would not have.

In view of this, it is desired that the second sync mark 130 should have such a bit pattern that the second sync mark 130 may be detected with high probability (that is, at mall risk of detection errors), even if the base line of the reproducing signal changes.

To be more specific, the second sync mark 130 should have a pattern with a long DC-erase region in which only "0s" or "1s" follow one after another, so that the reproduced signal stays at the same amplitude for a long time. In other words, the second sync mark 130 should better have a bit pattern in which bits corresponding to those parts of the disk 1 that are positively or negatively magnetized.

The disk drive according to this embodiment is one that performs perpendicular magnetic recording, however. Therefore, a base-line off, if any resulting from TA, is almost maximal at the end of the region of the second sync mark 130 that is a signal having a constant amplitude. Consequently, a base-line offset is present, also in the starting part of the second user data item that follows the second sync mark 130.

The second user data item 140 is one that has an almost random bit pattern. Hence, it cannot be reliably detected if the second sync mark 130 has such a bit pattern that imparts a long DC-erase region to the second sync mark 130. Consequently, errors may be made in detecting bits.

This is because the read/write channel 50 for perpendicular magnetic recording has a low-band frequency cutoff characteristic. Therefore, a base-line offset occurs in the second sync mark 130 that has a continuous sequence of "0s" or "1s." This base-line offset is strain of low-band frequency cutoff and is, therefore, a problem.

The disk drive according to the present embodiment writes the second sync pattern 130 in a data sector of the disk 1 during the writing of data. The second sync pattern 130 is a pattern that can be reliably detected even if it undergoes a base-line offset and which would not lower the ability of detecting the second user data item 140 that follows the second sync mark 130. A bit pattern that is desirable for the second sync mark 130 will be described below.

FIG. 4 is a graph representing the result of an experiment conducted to demonstrate how the second sync mark 130 may influence the ability of detecting the second user data item 140 recorded in the region following the region where the second sync mark is recorded. In FIG. 4, the ratio (%) of the consecutive bits of the same polarity (i.e., "0s" or "1s") to all bits constituting the second sync mark 130 is plotted on the x-axis. And the bit-error rate (in logarithm) observed in reproducing the second user data item 140 is plotted on the y-axis.

The experiment was carried out on the assumption that the highest tolerable bit-error rate is −6. As evident from FIG. 4, it is desirable for the second sync mark 130 to have a bit pattern in which the ratio of the consecutive bits of the same polarity (i.e., "0s" or "1s") to all bits is at least 50% but less than 85%. In other words, the second sync mark 130 should not have a bit pattern in which the ratio of the consecutive bits of the same polarity (i.e., k "0s" or "1s") to all bits is 80% or more.

Assume that the bit pattern of the second sync mark 130 has consecutive "0" bits (each representing negative polarity) that define a bit length Tm and consecutive "1" bits (each representing positive polarity) that define a bit length Tp.

The two bit patterns written in the disk 1 and constituting the second sync mark 130 may have the same bit length, that is Tp=Tm. Namely, half (50%) the number of bits constituting the second sync mark 130 represent positive polarity, and the remaining half (50%) the number of bits represent negative polarity. This type of a bit pattern is called "DC-balanced pattern."

Alternatively, the second sync mark 130 may have at least two bit patterns having bit lengths Tp and Tm, where |TP−Tm|≦10 bits.

Generally, the second sync mark 130 has a total bit length of 20 bits or more. Assume that the second sync mark 130 has a total bit length of 20 bits and two bit patterns having bit lengths Tp and Tm, where |TP−Tm|=1≦10 bits. Then, Tp=15 and Tm=5. Thus, the ratio of the longest bit length defined by bits of the same polarity to all bits constituting the second sync mark 130 is 0.75 (=15/20). This ratio meets the above-mentioned requirement that the ratio of the consecutive bits of the same polarity to all bits should be at least 50% but less than 85%.

It is desired that the second sync mark 130 should contain no bit patterns of NRZ-recording rule, which are very likely to cause a detection error of the mark 130 in a PRML system. (In the NRZ-recording rule, "0" bits and "1" bits are alternately recorded in the disk 1, each "0" bit representing the negative polarity and each "1" bits representing the positive polarity.) More specifically, the second sync pattern 130 should not contain a bit pattern of "101," "010," "1010," "0101," "10101" or "01010." It is also desired that the second sync mark 130 should contain no bit patterns containing recorded bits that represent user data or ECC data modulated with RLL codes.

An example of the bit pattern that the second sync mark 130, each satisfies the above-mentioned requirement, will be described with reference to FIG. 3A to 3F.

FIGS. 3A and 3D represent the bit pattern contained in the sync mark 130. The bit pattern consists of two regions S1 and S2. The region S1 is defined by "0" bits (representing negative polarity) and has a bit length Tm. The region S2 is defined by "1" bits (representing positive polarity) and has a bit length Tp. Note that the bit lengths Tm and Tp are equal (Tm=Tp).

As FIG. 3A shows, the first region A of the second sync mark 130, which has a bit length L of 1, is a region which does not form a bit pattern such as "101" or "010." If the last bit K of the first user data item 120 is "1," one "1" bit is recorded in the first region A. This is because a pattern of "101" will be formed if a "0" bit is recorded in the first region A.

If the last bit K of the first user data item 120 is "1," one "0" bit may be recorded in the first region A as illustrated in FIG. 3D. This is because a pattern of "010" will be formed if a "1" bit is recorded in the first region A.

Thus, the bit pattern of the second sync mark 130 changes as shown in FIG. 3A and FIG. 3D, depending on the value of the last bit K of the first user data item 120. Nonetheless, the bit in the first region A of the second sync mark 130 is not used in the bit-pattern matching performed in the sync mark detector 37.

The user data and the ECC data are modulated with RLL codes. The maximum run length in the NRZI-recording rule is 10 bits. That is, the number of consecutive bits representing the same polarity should be 10 or less.

In the bit pattern of the second sync mark 130, the regions S1 and S2 consist of 11 bits each. The bit pattern of the second sync mark 130 contains neither the bit pattern of the user data nor the bit pattern of the ECC data. Note that the user data and ECC data have been modulated with RLL codes.

FIGS. 5A and 5B depict a first modification of the bit pattern for the second sync mark. FIGS. 6A and 6B shows a second modification of the bit pattern. FIGS. 7A and 7B depicts a third modification of the bit pattern.

The two bit patterns of FIGS. 5A and 5B are different from those of FIGS. 3A and 3D in that the region S1 is defined by "1" bits and the region S2 is defined by "0" bits. However, the bit length Tp of the first region S1 is equal to the bit length Tm of the region S2.

That is, "1" bits are recorded in the region S1, each representing the positive polarity, and "0" bits are recorded in the region S2, each representing the negative polarity. Namely, the second sync mark 130 contains a bit pattern consisting of these regions S1 and S2.

The bit pattern of FIG. 5A has one "1" bit in the first region A, because the last bit K of the first user data item 120 is "1." By contrast, the bit pattern of FIG. 5B has one "0" bit in the first region A, because the last bit K of the first user data item 120 is "0."

The bit patterns of FIGS. 6A and 6B are characterized in that the regions S1 and S2 differ in terms of bit length. More precisely, the region S1 defined by "0" bits has a bit length Tm shorter than the bit length Tp of the region R2. That is, Tm<Tp. Note that |TP−Tm|=1≦10 bits.

Thus, "0" bits (representing negative polarity) are recorded in the region S1, which therefore has a bit length Tm. And "1" bits (representing positive polarity) are recorded in the region S2, which therefore has a bit length Tp. Hence, the second sync mark 130 has a bit pattern that contains these regions S1 and S2.

The bit pattern of FIG. 6A has one "1" bit in the first region A, because the last bit K of the first user data item 120 is "1." By contrast, the bit pattern of FIG. 6B has one "0" bit in the first region A, because the last bit K of the first user data item 120 is "0."

The bit patterns of FIGS. 7A and 7B consist of regions A, S1, S2, S3 and S4 each. The region A has a bit length L. The regions S1 and S3 are defined by "0" bits and have bit lengths Tm1 and Tm2, respectively. The regions S2 and S4 are defined by "1" bits and have bit lengths Tp1 and Tp2, respectively. Note that |Tp−Tm|=1. These regions A, S, S2, S3 and S5 constitute the bit pattern of the second sync mark 130.

The bit pattern of FIG. 7A has one "1" bit in the first region A, because the last bit K of the first user data item 120 is "1." On the other hand, the bit pattern of FIG. 7B has one "0" bit in the first region A, because the last bit K of the first user data item 120 is "0."

In summary, an ordinary random pattern is written as first sync mark 110 and a bit pattern that meets the requirement shown in FIG. 4 is written as second sync mark 130, when data is written in the sector format shown in FIG. 2B.

The second sync mark 130 contains a bit pattern a half (50%) of which is defined by consecutive "0" bits that represent the negative polarity, and remaining half (50%) of which is defined by consecutive "1" bits that represent the positive polarity.

The bit defining the region A, i.e., the first region of the second sync mark 130, is "0" or "1" in accordance with the value of the last bit of the first user data 120. Thus, the second sync mark 130 does not contain a bit pattern of "101," "010," "1010," "0101," "10101" or "01010," which is very likely to cause a detection error of the mark 130.

In the disk drive according to the present embodiment, which performs perpendicular magnetic recording, the second sync mark 130 can be detected at high probability even if the second sync pattern 130 undergoes a base-line offset caused by TA while the data is being read from the disk 1. This reduces the bit-error rate in reproducing the second user data item 140.

(Another Embodiment)

FIG. 8, FIG. 9A to 9C, FIG. 10A to 10C, FIG. 11 and FIG. 12 illustrates another embodiments of the present invention.

Figure 8:
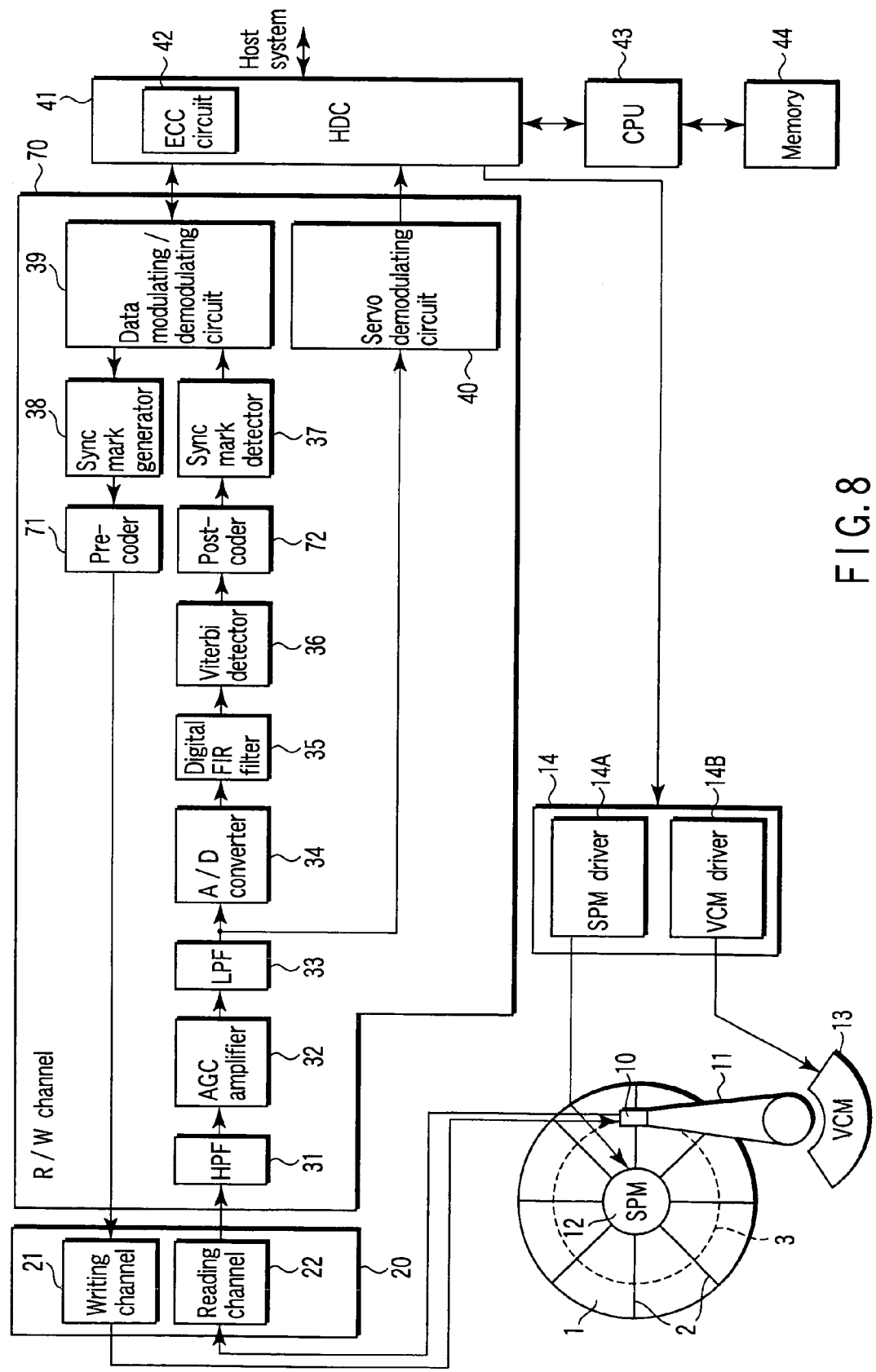
FIG. 8 is a block diagram showing the major components of a disk drive according to another embodiment of this invention.

FIG. 8 is a block diagram showing the major components of a disk drive according to the other embodiment of the invention. As FIG. 8 shows, this disk drive has a pre-coder 71 and a post-coder 72. The pre-coder 71 and the post-coder 72 are incorporated in the write channel and the read channel, respectively. This disk drive is identical to the disk drive of FIG. 1, in any other respects. The components identical to those of the disk drive shown in FIG. 1 are designated at the same reference numerals and will not be described.

Figure 11:
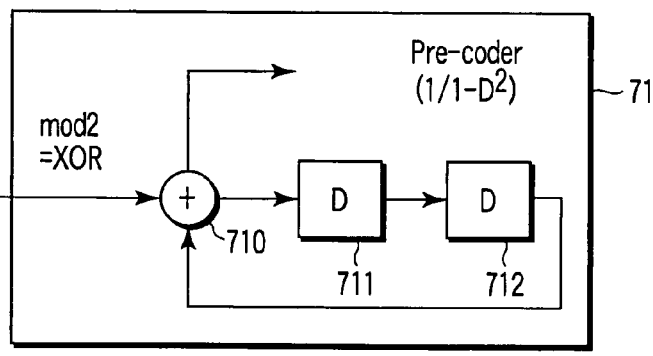
FIG. 11 is a block diagram of the pre-coder used in the other embodiment of this invention.

As FIG. 11 depicts, the pre-coder 71 has an exclusive OR gate 710 and two 1-bit delay elements 711 and 712. The pre-coder 71 is a circuit that has the transfer characteristic represented by transfer polynomial of $1/1-D^2$.

Figure 12:
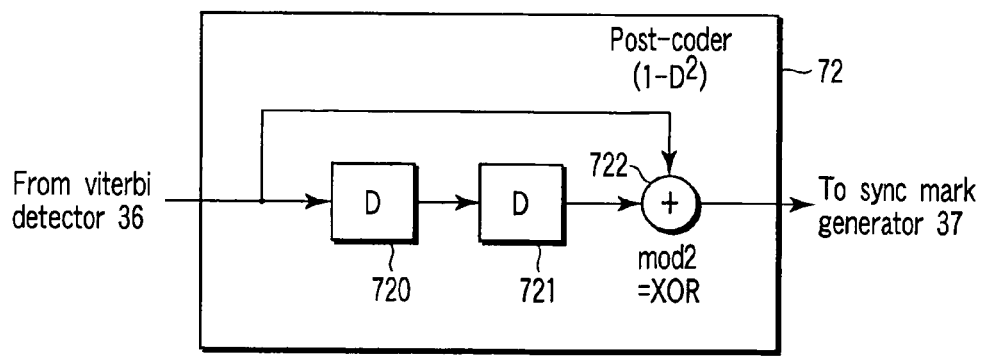
FIG. 12 is a block diagram of the pre-coder used in the other embodiment of the present invention.

As FIG. 12 shows, the post-coder 72 has two 1-bit delay elements 720 and 721 and an exclusive OR gate 722. The post-coder 72 is a circuit that has the transfer characteristic represented by transfer polynomial of $1-D^2$.

In the read/write channel 70 shown FIG. 8, the user data is written in the disk 1 as follows. First, the data-modulating/demodulating circuit 39 modulates the user data and the ECC data added to the data, with RLL codes that have a coding ratio (M/N). Next, the pre-coder 71 modulates the user data and the ECC data. Then, the head 10 records the data output from, in the disk 1.

To read data from the disk 1, the viterbi detector 36 detects the series of data bits. The post-coder 72 demodulates the series of bits, which is sent to the data-modulating/demodulating circuit 39. The circuit 39 demodulates the series of bits.

In the other embodiment, the second sync mark 130 has a bit pattern designed to be modulated by the pre-coder 71. That is, the bit pattern of the second sync mark 130 is identical to the bit pattern demodulated by the post-encoder 72.

In the other embodiment, too, the second sync mark 130 has a bit pattern that can be reliably detected even if the second sync mark 130 undergoes a base-line offset caused by TA. This bit pattern would not lower the ability of detecting the second user data item 140 that follows the second sync mark 130. More precisely, the ratio of the consecutive bits of the same polarity (positive or negative) to all bits is 50% to 85% in this bit pattern. Further, the second sync mark 130 contains at least one bit pattern that consists of a region having a bit length Tp and defined by consecutive "1" bits representing the positive polarity and a region having a bit length Tm and defined by consecutive "0" bits representing the negative polarity, where |Tp−Tm1|=1≦10 bits.

Moreover, the second sync mark 130 contains no bit patterns of NRZ-recording rule, which are very likely to cause a detection error of the mark 130 in a PRML system. (In the NRZ-recording rule, "0" bits and "1" bits are alternately recorded in the disk 1, each "0" bit representing the negative polarity and each "1" bits representing the positive polarity.) In other words, the second sync pattern 130 does not contain a bit pattern of "101," "010," "1010," "0101," "10101" or "01010." Nor does the sync mark 130 contain any bit patterns that include recorded bits representing user data or ECC data modulated with RLL codes.

FIG. 9A to 9C are diagram representing bit patterns for the second sync mark 130 that is used in the other embodiment.

FIG. 9A shows the bit pattern that the second sync mark 130 has if the last bit of the first user data 120 recorded between the first sync mark 110 and the second sync mark 130 is "1." The bit pattern contains a pattern that consists of two regions S1 and S2. The region S1 is defined by consecutive "0" bits (representing negative polarity). The region S2 is defined by consecutive "1" bits (representing positive polarity). The regions S1 and S2 have bit lengths Tp and Tm, respectively. The bit lengths Tp and Tm are equal (i.e., Tp=Tm).

FIG. 9B shows the bit pattern that the second sync mark 130 has if the last bit of the first user data 120 recorded between the first sync mark 110 and the second sync mark 130 is "0." This bit pattern is inverse to the bit pattern shown in FIG. 9A. Namely, it contains a pattern that consists of two regions S1 and S2. The region S1 is defined by consecutive "1" bits (representing positive polarity). The region S2 is defined by consecutive "0" bits (representing negative polarity).

As described above in conjunction with the first embodiment, the first region A of the second sync mark 130, which has a bit length L of 1, is a region which does not form a bit pattern such as "101" or "010." If the last bit K of the first user data item 120 is "1," one "1" bit is recorded in the first region A. This is because a pattern of "101" will be formed if a "0" bit is recorded in the first region A.

If the last bit K of the first user data item 120 is "0," one "0" bit is recorded in the first region A. This is because a pattern of "010" will be formed if a "1" bit is recorded in the first region A. This is why a "0" bit is recorded in the first region A.

In this embodiment, the sync mark detector 37 performs the bit-pattern matching, using the series of bits output from the post-coder 72. The first bit in the first region A of the second sync mark 130 changes when it is output from the post-coder 72, in accordance with the bit that the viterbi detector 36 has detected from the first user data item 120. In other words, the first bit in the region A is changeable (X. Hence, the first bit in the region A is not used in the bit-pattern matching carried out to detect the second sync mark 130.

Figure 10A:
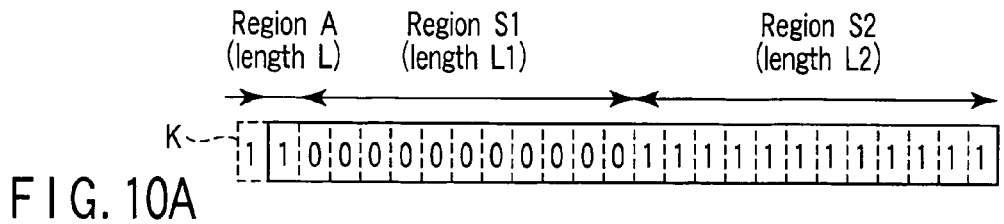
FIG. 10A to 10C are diagrams depicting other bit patterns for the second sync mark that is used in the other embodiment of the invention.
Figure 10B:
Figure 10C:
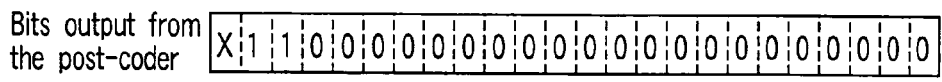

FIG. 10A to 10C are a diagram depicting other bit patterns for the second sync mark 130 that is used in the other embodiment of the invention. In these bit patterns, the regions S1 and S2 have bit lengths L1 and L2, where |L1−L2|=1.

Both embodiments described above are disk drives that perform perpendicular magnetic recording. They can reduce the adverse influence on the decoding of the data that immediately follows the second sync mark, thus achieving a low error rate in the data decoding.

In addition, the second sync mark can be reliably and correctly detected in both embodiments. This decreases the number of data-decoding retrials, which can helps to enhance the data throughput.

In summary, the present invention can provide a disk drive that can detect sync marks at high probability and does not increase the error rate in reproducing the user data that follows the sync marks.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive comprising:
a disk-shaped recording medium having data sectors each having a first sync-mark region, a second sync-mark region and a data region;
a magnetic head which writes data in each data sector of the disk-shaped recording medium;
sync-mark generating means for generating a bit pattern of a first sync mark for detecting a head of each data sector and a bit pattern of a second sync mark, which is different from the bit pattern of the first sync mark, the second sync mark having a bit pattern including at least a series of consecutive bits representing positive magnetization polarity and at least a series of consecutive bits representing negative magnetization polarity, a series of consecutive bits that consists of a largest number of bits of same magnetization polarity having a bit number that is at least 50% of a total bit number of the second sync mark but less than a percentage of the total bit number, set in accordance with a tolerable bit-error rate; and
writing means for supplying a data signal to the magnetic head, the data signal including the first sync mark and second sync mark which have been generated by the sync-mark generating means.

2. The disk drive according to claim 1, wherein the series of consecutive bits that consists of a largest number of bits of same magnetization polarity has a bit number that is at least 50% but less than 85% of the total bit number of the second sync mark.

3. The disk drive according to claim 1, wherein the series of consecutive bits that consists of a largest number of bits of same magnetization polarity has a bit number that is at least 50% of the total bit number of the second sync mark, and an upper limit of the bit number of the series of consecutive bits is at most about 80% of an upper limit set in accordance with the tolerable bit-error rate.

4. The disk drive according to claim 1, wherein the series of consecutive bits that consists of a largest number of bits of same magnetization polarity has a bit number that is at least 50% of the total bit number of the second sync mark, and an upper limit of the bit number of the series of consecutive bits is at most about 100% of an upper limit set in accordance with the tolerable bit-error rate.

5. The disk drive according to claim 1, wherein the data region includes a first data region and a second data region, and the second sync mark follows the first data region and precedes the second data region, the first sync mark preceding the first data region.

6. The disk drive according to claim 1, wherein the bit pattern of the second sync mark includes at least one pattern which consists of a first series of bits, having a bit number Tp, and a second series of bits, having a bit number Tm, the bits of the first series represent the positive magnetization polarity, the bits of the second series represent the negative magnetization polarity, and the difference in number of bits between the first series and the second series is at most ten (10).

7. The disk drive according to claim 1, wherein the bit pattern of the second sync mark is not included in a bit pattern of user data which is recorded in the data region.

8. The disk drive according to claim 1, wherein the bit pattern of the second sync mark includes patterns other than six types of "101," "010," "1010," "0101," "10101" and "01010".

9. The disk drive according to claim 1, wherein the data region includes a first data region and a second data region, the first sync-mark region preceding the first data region, the second sync-mark region follows the first data region and precedes the second data region, and the bit pattern of the second sync mark contains the last bit ("0" or "1") recorded in the first data region and includes patterns other than six types of "101," "010," "1010," "0101," "10101" and "01010."

10. A method for use in a disk storage apparatus which uses a magnetic head to perform perpendicular magnetic recording on a disk-shaped recording medium having data sectors each including a first sync-mark region, a second sync-mark region and a data region, the method comprising:
    writing a first sync mark for detecting a head of each sector, in the first sync-mark region, before writing data in the data region of the sector; and
    writing a second sync mark in the second sync-mark region, the second sync mark being different in bit pattern from the first sync mark, the bit pattern of the second sync mark including at least a series of consecutive bits representing positive magnetization polarity and at least a series of consecutive bits representing negative magnetization polarity, a series of consecutive bits that consists of a largest number of bits of same magnetization polarity having a bit number that is at least 50% of a total bit number of the second sync mark but less than a percentage of the total bit number, set in accordance with a tolerable bit-error rate.

11. The method according to claim 10, wherein the series of consecutive bits that consists of a largest number of bits of same magnetization polarity has a bit number that is at least 50% but less than 85% of the total bit number of the second sync mark.

12. The method according to claim 10, wherein the series of consecutive bits that consists of a largest number of bits of same magnetization polarity has a bit number that is at least 50% of the total bit number of the second sync mark, and an upper limit of the bit number of the series of consecutive bits is at most about 80% of an upper limit set in accordance with the tolerable bit-error rate.

13. The method according to claim 10, wherein the series of consecutive bits that consists of a largest number of bits of same magnetization polarity has a bit number that is at least 50% of the total bit number of the second sync mark, and an upper limit of the bit number of the series of consecutive bits is at most about 100% of an upper limit set in accordance with the tolerable bit-error rate.

14. The method according to claim 10, wherein the bit pattern of the second sync mark includes at least one pattern which consists of a first series of bits, having a bit number Tp, and a second series of bits, having a bit number Tm, the bits of the first series represent the positive magnetization polarity, the bits of the second series represent the negative magnetization polarity, and the difference in number of bits between the first series and the second series is at most ten (10).

15. The method according to claim 10, wherein the bit pattern of the second sync mark is not included in a bit pattern of user data which is recorded in the data region.

16. The method according to claim 10, wherein the bit pattern of the second sync mark includes patterns other than six types of "101," "010," "1010," "0101," "10101" and "01010."

17. The method according to claim 10, wherein the data region includes a first data region and a second data region, the first sync-mark region preceding the first data region, the second sync-mark region follows the first data region and precedes the second data region, and the bit pattern of the second sync mark contains the last bit ("0" or "1") recorded in the first data region and includes patterns other than six types of "101," "010," "1010," "0101," "10101" and "01010."

* * * * *